United States Patent [19]

Knauss, Jr. et al.

[11] Patent Number: 4,695,318

[45] Date of Patent: Sep. 22, 1987

[54] METHOD OF MAKING STEEL

[75] Inventors: William F. Knauss, Jr.; Uday B. Pal, both of Pittsburgh; Balaji V. Patil, Sarver, all of Pa.

[73] Assignee: Allegheny Ludlum Corporation, Pittsburgh, Pa.

[21] Appl. No.: 917,864

[22] Filed: Oct. 14, 1986

[51] Int. Cl.$^4$ .............................................. C21C 7/02
[52] U.S. Cl. ...................................... 75/51.1; 75/46; 75/53; 75/58
[58] Field of Search ................... 75/25.7, 51.1, 53, 58, 75/46

[56] References Cited

U.S. PATENT DOCUMENTS 4,036,635 7/1977 Klapdar ................................. 75/58

OTHER PUBLICATIONS

K. Narita et al., Transactions, ISIJ, p. B-112, vol. 20, No. 4, 1980.
E. T. Turkdogan, Ironmaking and Steelmaking, pp. 64–78, vol. 12, No. 2, 1985.
H. Saito et al., Trans. ISIJ, p. B-345, vol. 22, 1982.
A. Ishii et al., "The Ladle Refining Process for Alloyed Oil Country Tubular Goods Steels at Nippon Kokan KK", pp. 137 to 144 of Ladle Metallurgy Principles and Practices, published by the Iron and Steel Society of the AIME, edited by R. J. Fruehan, published 1985.
T. Takenouchi et al., Trans. ISIJ, pp. 758 to 765, vol. 19, 1979.
F. J. Havrilla et al., Start-up and Operation of USS Loraine-Cuyahoga Works, CAB Ladle Treatment Facilities, 1984.
D. J. Diederich et al., "Improving Internal Cleanliness for Bar and Rod Products", USS Publication, date not specified.
A. Moriya et al., "Steel Quality Improvement by Flux Injection", Scaninject III, Part III, pp. 32:1–32:34, 1983.
J. G. Yount et al., Steel Making Proceedings, pp. 194–202, vol. 64, 1981.

Primary Examiner—Peter D. Rosenberg
Attorney, Agent, or Firm—Patrick J. Viccaro

[57] ABSTRACT

There is practiced a method of making low carbon silicon steel in which the lining of the ladle is made of dolomite instead of fireclay or alumina, and there is added to the ladle, before the metal is teemed into it, a pre-melted or pre-fused mixture containing appropriate portions of calcium silicate, lime, magnesia, and spar, and argon bubbling is practice as before but preferably for a slightly longer period of time, and the ladle is provided during argon bubbling with a hood or lid. There is then obtained a product steel with desirably low contents of oxygen and nitrogen, and without penalty in the form of higher contents of aluminum and titanium in the finished steel.

19 Claims, 3 Drawing Figures

METHOD OF MAKING STEEL

BACKGROUND OF THE INVENTION

1. Field of the Invention

This invention relates to the making of steel, and in particular, it relates to the making of oxide inclusion free low-carbon steels with desirably low nitrogen content. Still more particularly, it relates to the making of steels of the kind indicated above which contain about 1.0 to 4.5 percent of silicon as an alloying element and are intended for use in sheet or strip form in the electrical industry in applications in which the magnetic properties of the steel are important.

In one aspect of the invention, the invention relates to a composition of matter in the nature of a "synthetic slag material" or a "synthetic flux material", and to the method in which that composition of matter is used especially during bubbling of an inert gas in the making of steel of the kind indicated above.

In another aspect, the invention is particularly concerned with a method wherein the use of the composition of matter mentioned above is combine with certain other measures and expedients in the processing of the steel during the stages thereof between the completion of the blowing with oxygen in an oxygen steelmaking vessel and the pouring of the steel into an ingot mold or a continuous-casting machine. In other words, the invention is concerned with the in-ladle treatment of a ferrous melt in order to bring it to a desirable chemistry, temperature, and degree of homogeneity to suit it for the subsequent pouring or casting step.

2. Description of the Prior Art

There may be taken as known a practice for making a silicon electrical steel of the kind practiced by the applicants' assignee for several months before the present invention was made. The prior practice is useful for producing grain-oriented silicon steel generally, which steel melt may initially contain the nominal compositions of:

| C | Mn | S | Si | Cu | Fe |
|---|---|---|---|---|---|
| 0.03 | 0.07 | 0.03 | 3.2 | 0.2 | Balance | and impurities, where the impurities may include on the order of 10 parts per million aluminum, 15 parts per million titanium, 50 parts per million oxygen, and 55 parts per million nitrogen.

In accordance with the previous practice mentioned above, it is a known practice to desulfurize the steel by injecting calcium carbide in a hot metal ladle, and then blowing a mixture of desulfurized hot metal and scrap in a basic oxygen furnace to an aim turn-down composition of 0.025 to 0.035 percent carbon and an aim turn-down temperature. About 80 tons of this low-carbon steel from the BOF is then tapped into a zoned ladle containing an appropriate amount, approximately 7500 pounds, of a low-aluminum, low-titanium ferrosilicon, then bubbled with argon lance or bubbler at a suitable flow rate for a sufficient time to achieve improvements in cleanliness of the melt. Additions of manganese, carbon, sulphur, and copper are made in the ladle, as necessary, based upon the observed chemistry of a sample taken after tapping from the basic oxygen furnace. In this prior practice, there is no purposeful addition of any flux material to the ladle. During the bubbling, there is generated in the ladle a slag which has relatively high contents of alumina (8 percent) and titania (0.5 percent).

By zoned ladle, it is meant that the ladle or vessel is lined with various grades of alumina-silica refractory on the bottom and sidewalls. For example, a fireclay having 40 to 60 percent alumina-balance silica may be used to line a vessel, except for a zone adjacent a slag layer which zone may have a refractory having 80 percent alumina-balance silica.

Those skilled in the art have long been aware of the desirability of getting and keeping the total oxygen content, dissolved oxygen plus oxides of steel as low as possible.

A low-carbon steel ($<0.05\%$) coming out of an oxygen-blown furnace (such as a BOF), contains large amounts of dissolved oxygen ($>0.05\%$). The dissolved oxygen in the steel is then removed (deoxidized) by adding one or more deoxidizers such as Al, Si, Mn, etc., depending on the grade of the steel to be made. The deoxidizers remove the dissolved oxygen by forming oxides which ideally should float out of the melt and be absorbed into the slag phase. However, the flotation and absorption of these oxides is always incomplete and they remain suspended in the melt, resulting in a total oxygen which is much greater than the dissolved oxygen.

Oxygen, if not removed, tends to react with other elements present, like the iron, silicon, aluminum, and titanium, to form inclusions and create a "dirty steel". It is especially difficult to obtain desirably low dissolved-oxygen contents in the low-carbon steels, the steels containing about 0.05 percent of carbon or less. With steels richer in carbon, the carbon-oxygen reaction drives dissolved oxygen out of the melt, but in low-carbon steels, this reaction does not occur to any so great an extent. Thus, when product steels are desired that need to be low in carbon (like the silicon electrical steels, where high carbon contents are associated with greater core losses and/or other impaired electrical or magnetic properties), obtaining a desirably lower content of dissolved oxygen poses a more difficult problem.

With the practice indicated above, using the zoned ladle, it was found that whenever measures were taken to lower the oxide inclusions in the melt, the dissolved oxygen also got slightly lowered and then there would be obtained a steel undesirably higher in its contents of aluminum and titanium. What happens in this process is controlled or greatly influenced by the equilibrium between the chemical composition of the slag and the chemical composition of the underlying steel.

In the case of the above-mentioned previous practice with the use of a zoned ladle, there was generated a slag containing about 28 percent lime, 48 percent silica, 8 percent alumina, 0.5 percent titania, 10 percent magnesia, and 1 percent manganese oxide.

A ladle entirely lined with 80 percent alumina instead of the zoned ladle has been used, and there was then obtained a slag composition which was essentially the same, except for a slightly lower (0.3 percent) content of titania. With the higher alumina-lined ladle, there were the same problems of too-high aluminum and titanium contents, if the dissolved-oxygen content got slightly lowered.

There are, in the prior art, various known methods and apparatus for treating molten steel to remove dissolved gases or to remove nonmetallic inclusions there, such as the Dortmund-Horder, RH and VOD processes, or other methods such as the use of electric arc ladle furnaces, ASEA-SKF ladle furnaces and the like; the principal drawback of these processes and methods is that they are relatively costly to practice.

There can be taken as belonging to the prior art a commercially available typical calcium silicate composition containing about 50 percent silica, 47 percent lime, and small amounts of various impurities.

Such material has a melting point of about 2811 degrees Fahrenheit, and a bulk density of approximately 80 pounds per cubic foot, and it is available at a cost sufficiently low that it can be used in substantial quantities without causing the steelmaking process to become uneconomical. The prior art has not contained, however, any particular teachings or suggestions about how to use such a material to obtain the favorable results that are available with the present invention; in fact, our own first several experiences with trying to use such a material, which were in ways not in accordance with the present invention, did not yield the desired results.

It may be taken that the addition of fluorspar (calcium fluoride), as an agent for making a slag less viscous, is well known. Substitutes or equivalents for fluorspar are known to those skilled in the art.

There is a body of prior art which concerns the chemical compositions of the refractory materials used to line vessels for holding molten ferrous metals, and the chemical compositions of the slags which form (or are provided) on top of the molten ferrous metals. The refractory materials may be acidic, like silica brick, or basic, like dolomite, or more nearly neutral, like alumina or fireclay. A slag composition may likewise be characterized as acidic or basic, largely in accordance with the relative proportions of the acid-forming and base-forming oxides present. Slags richer in silica and in iron oxide are more acidic; slags richer in lime or magnesia are more basic. It is known that it is important to avoid having a slag too acidic in a vessel lined with a basic refractory, or vice versa, because this leads to having the slag attack the lining the shorten its service life. Iron-refining processes conducted with a slag which is basic, rather than acidic, do a better job of removing sulphur and phosphorus from the molten ferrous material.

Those skilled in the art are aware that in the step following the blowing with oxygen, the step of making a ladle addition of enough ferrosilicon to get the composition of the steel up of the level of silicon content desired for an electrical steel, about 1.0 to 4.5 percent by weight, hardly any slag is formed naturally, except to the extent that the molten metal comes into contact with air or oxygen, either dissolved oxygen or a combined oxygen in the form of some metal oxides. The molten metal will, in the absence of a slag covering, not only react readily with any available oxygen to form metal oxides but also pick up nitrogen readily if it comes into contact with air. Bubbling with argon is practiced in order to provide adequate mixing of the ferrosilicon with the ferrous melt removed from the oxygen vessel and, primarily to float out silicon oxide inclusions from the ferrous melt, formed as a result of silicon deoxidation.

The step of lancing or bubbling with an inert gas, particularly argon, in a ladle covered with a suitable lid or cover, during the making of a homogeneous melt from the ferrosilicon and the blown metal removed from the basic oxygen furnace, is old well known. By inert gas it is meant any gases which are chemically inactive or have permissibly low activity in the melt and may be used.

There are prior art references which relate to calcium aluminate synthetic slags or relate to the use of synthetic-flux or synthetic-slag material which are introduced by lancing, that is, conveying the material into the steel in the ladle by means of a stream of carrier gas. These include the following items:

1. K. Narita et al., Trans. ISIJ, page B-112, Vol. 20, No. 4, 1980.
2. E. T. Turkdogan, Ironmaking and Steelmaking, page 64, Vol. 12, No. 2, 1985.
3. H. Saito et al., Trans. ISIJ, page B-345, Vol. 22, 1982.
4. A. Ishi et al., Ladle Metallurgy Principles and Practices, Published by Iron and Steel Society of AIME, Edited by R. J. Fruehan, page 137, 1985.
5. T. Takenouchi et al., Trans. ISIJ, page 758, Vol. 19, 1979.
6. Start up and Operation of USS Lorain-Cuyahohga Works CAB Ladle Treatment Facility, Public Document, Reprint Available.
7. D. J. Diederich et al. "Improving Internal Cleanliness For Bar and Rod Products", United States Steel Publication, Lorain, Ohio.
8. A. Moriya et al., SCANINJECT III, Part III, page 32:1, 1983.
9. J. G. Yount and R. J. Zaranek, "Steelmaking Proceedings", page 194, Vol. 64, 1981.

BRIEF SUMMARY OF THE INVENTION

If the lining of the ladle is made of a low alumina, low titania containing material such as dolomite, instead of fireclay or alumina, and there is added to the ladle, beofre the metal is teemed into it, on top of the ferrosilicon, a synthetic slag which is preferably a pre-melted or pre-fused mixture containing appropriate portions of calcium silicate, lime, magnesia, and spar, and argon bubbling is practiced as before but preferably for a slightly longer period of time, and the ladle is provided during argon bubbling with a hood or lid there is then obtained a low-carbon silicon steel with desirably low contents of dissolved oxygen, oxide inclusions, nitrogen and sulphur and without penalty in the form of higher contents of aluminum and titanium in the finished steel.

DESCRIPTION OF THE DRAWING

A complete understanding of the invention may be obtained from the foregoing and following description thereof, taken in conjunction with the appended drawings of which

DESCRIPTION OF THE PREFERRED EMBODIMENTS

Figure 1:
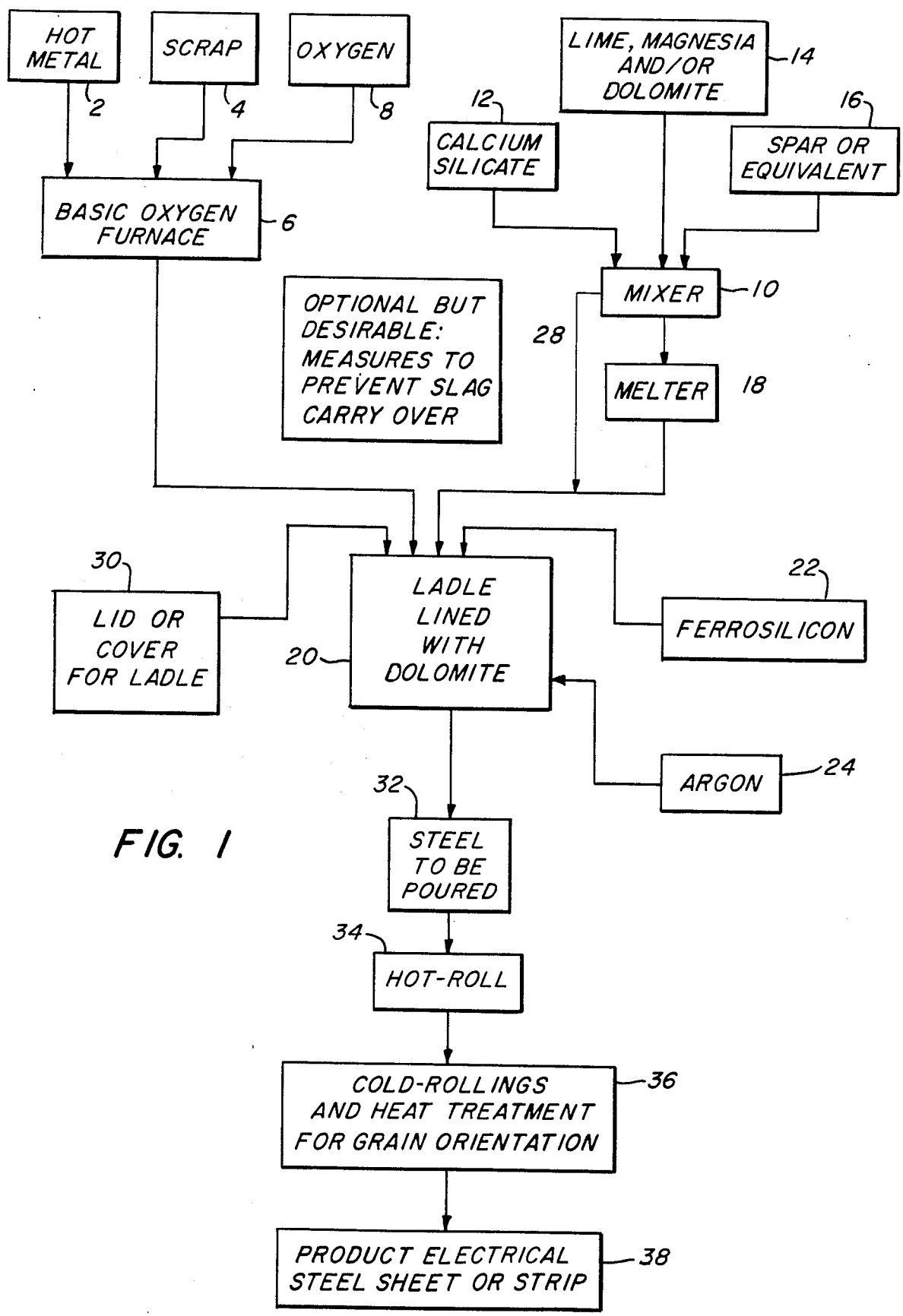
FIG. 1 is a flow diagram indicating the process of the invention.

As shown in FIG. 1, hot metal 2 and scrap 4 and fluxes are charged to a basic oxygen furnace 6, which is then blown with oxygen 8, in a manner well known to those skilled in the art. When the objective is to make the above-mentioned electrical steel, the basic oxygen furnace 6 which is lined with dolomite, magnesite or other suitable material is operated until the molten ferrous metal therein contains approximately 0.025 to 0.035 percent carbon and at the desired turn-down temperature.

There is prepared, in accordance with the invention, in a mixer 10 a suitable mixture of calcium silicate 12, alkaline-earth material 14 such as lime, magnesia and/or dolomite, and fluorspar 16 or its equivalent. For treating an 80-ton quantity of ferrous material withdrawn from the basic oxygen furnace 6, there may be used 1500 pounds of calcium silicate, 1200 pounds of lime, 200 pounds of magnesia, and about 200 pounds of fluorspar. This creates a blend forming a synthetic flux slag which has an approximate melting point 2550 degrees Fahrenheit and a specific gravity of about 2.5 with respect to water at 1.0. Hence, in liquid form, the synthetic flux slag at tapping and teeming temperatures greater than 2800 degrees Fahrenheit is lighter than the silicon steel so that the slag will float on the steel in the ladle throughout teeming and a bubbling of argon in the ladle to prevent exposure of the steel to air; the above-indicated composition in the mixer 10 is preferably melted in a melter 18.

The synthetic flux composition may consist essentially of about 30 to 80 weight percent of a commercially pure calcium silicate, about 20 to 65 weight percent of an oxide selected from the group consisting of calcium oxide and magnesium oxide, and about 2 to 15 weight percent of a fluidity-promoting agent. In a preferred embodiment, the flux composition comprises about 2 to 15 weight percent of a fluidity-promoting agent, 20 to 50 weight percent of lime, 3 to 11 weight percent of magnesia, and the balance substantially all calcium silicate. It is important that the synthetic flux composition be as low as possible in alumina and titania, preferably less than 5 percent and 2 percent by weight, respectively, and, more preferably, less than 0.7 and 0.1 weight percent, respectively.

There is provided a ladle 20, which preferably according to the invention is lined with dolomite, rather than being lined with fireclay or alumina. It is important that the ladle 20 is provided with a low alumina, low titania lining. A fireclay lining, for example, in a ladle is unacceptable because the synthetic flux slag becomes contaminated with undesirable amounts of alumina and titania (titanium oxide). It has been discovered that any attempt to reduce the total oxygen content of the melt in a ladle having a fireclay lining brings about an unacceptable increase to the quantities of aluminum and titanium in the melt. It is preferred that the ladle lining have less than 5 percent, by weight, alumina and less than 2 percent, by weight, titania, and more preferably, be substantially free of alumina and titania.

For treating, for example, an 80-ton quantity of metal withdrawn from the basic oxygen furnace 6, a suitable quantity of ferrosilicon 22 may be charged to ladle 20. To produce a steel having a final composition of about 3.25 percent silicon, there is required a quantity of ferrosilicon having approximately 2.6 tons of contained silicon, which is preferably a low-aluminum, low-titanium ferrosilicon. Approximately 7500 pounds of ferrosilicon material containing about 75 percent of silicon is placed in the ladle 20. The ladle 20 is provided with means 24 for causing argon to be bubbled through the contents of the ladle 20.

After the ferrosilicon 22 is added to the ladle 20, the synthetic flux material is added to the ladle 20. It is not essential to use the mixer 10 and melter 18 for this purpose since the components of the synthetic flux can be added directly on the top of the ferrosilicon in the ladle.

The hot ferrous metal, the synthetic flux and the ferrosilicon may be added to a ladle, for example, in any order, although commercially, the hot metal is typically added to a ladle containing ferrosilicon. The synthetic flux may be added through lance injection, for example.

Next, as indicated by the arrow 26, the hot ferrous metal from the basic oxygen furnace 6 may be added to the ladle 20, and as indicated in FIG. 1 by reference numeral 28, optionally, but desirably, there are taken some measures to prevent slag carryover from the basic oxygen furnace 6 into the ladle 20. If suitable measures are not taken during tapping, unknown and inconsistent amounts of slag from the basic oxygen furnace 6 can enter the ladle be vortexing through the steel which is being tapped through the side taphole of the furnace 6. The iron oxide contained in the slag of the furnace 6 will act as a source of silica in the slag in the ladle by reacting with the silicon contained in the ferrosilicon; this generation of silica, if it is permitted to occur, will change the basicity of the synthetic slag in the ladle 20. The change is in the direction of making the slag more acidic and more prone to attack the vessel lining, which is dolomite, a basic refractory. Moreover, the slag in the furnace 6 contains about 1.5 percent alumina and about 0.2 percent of titania, and both of these values are about twice as high as the values which are desired in the synthetic top slag which is used in the ladle 20 in accordance with the present invention and which is desirably kept as low as possible in alumina and titania, in order to achieve the required low values of aluminum and titanium in the product steel. Those skilled in the art will understand how to use one or more, if necessary, of suitable measures for minimizing, and preferably avoiding entirely, any carryover of BOF slag from the vessel 6 to the ladle 20.

When preloading of the synthetic flux blend into the ladle and thereafter tapping the BOC heat onto the blend in the ladle, nitrogen pickup by the heat is minimized when using the optimized flux blend. It was discovered that there was no additional pickup of nitrogen during tapping and argon bubbling, as will be shown in greater detail hereinafter, as 1 part per million net reduction nitrogen content occurred during tapping and a net decrease of 4 parts per million occurred during argon bubbling. For heats made with an optimized synthetic slag addition to a dolomite teeming ladle, the average turndown nitrogen content was 43 parts per million and the final nitrogen content after BOF tapping and argon bubbling of 38 parts per million. On the other hand, regular heats made without a synthetic slag addition in a zoned teeming ladle, were found to have an average turndown of nitrogen content of 43 parts per million and a final nitrogen content after BOF tapping and argon bubbling of 50 parts per million. A comparison was made of the hot-rolled band nitrogen content in standard heats using zoned ladles without synthetic slag additions and heats melted with optimized synthetic slag additions in dolomite teeming ladles. Samples taken of the standard heats were found to have a nitrogen content in the range of 35 to 71 parts per million and the average nitrogen was 54 parts per million. A significant reduction to the nitrogen content was found in the samples taken of the heats melted in dolomitic teeming ladles provided with synthetic slag addition. The nitrogen content of the samples fell within a range of 18 to 52 parts per million and the average nitrogen content was 36 parts per million.

As is indicated by reference numeral 30 in FIG. 1, the ladle 20 is provided with a lid or cover. This is considered important for its effect or permitting longer argon bubbling times without undue loss of heat, which is important in obtaining the desired desulfurization and the desired low levels of oxygen and nitrogen in the finished steel. Additionally, it is desirable to minimize exposure of the steel melt to air.

It is considered important to obtain, at the conclusion of the argon bubbling, an optimum synthetic-slag composition which is approximately 48 percent lime, 40 percent silica, 10 percent magnesia, less than 0.7 percent alumina, less than 0.1 percent titania, and less than 0.2 percent of MnO. This slag has a slag-basicity ratio ($CaO/SiO_2$) of 1.2, as compared with a slag-basicity ratio of 0.6 for the slag usually obtained at the end of argon bubbling in accordance with prior-art procedures using a zoned ladle and no added flux materials. It is also worth noting that the slag according to the above-mentioned prior-art practice contained about 8 percent of alumina, as compared with the 0.7 percent of alumina indicated in the above slag composition and the values averaging 1.4 percent alumina obtained in several heats by using a dolomitic ladle but no additions of synthetic slag.

The argon-bubbling treatment time should be long enough to complete the desired flotation and absorption of inclusions into the slag layer and to desulfurize the steel to a desirably low level, such as 0.03 percent or lower. A number of samples may be taken during the argon bubbling, mainly to monitor the course of desulfurization and to measure the steel temperature. In prior-art practices, without using synthetic flux additions and using a zoned ladle, and using argon flow rates as indicated above, there was an average shorter bubbling time and a smaller change from the after-tap temperature to the after-bubbling temperature. In contrast, taking the averages of heats made in accordance with the invention, using a dolomite ladle and synthetic flux additions, the average argon bubbling time was longer, and the after-tap temperture was higher and the average after-bubbling temperature was lower. In part, longer bubbling times were chosen in order to lower the teeming temperature as much as it was considered feasible, on the theory that lower teeming temperatures give a cleaner steel, i.e., one with a lower total oxygen content. By following the procedures indicated above according to the present invention, there is obtained the steel to be poured, indicated in FIG. 1 by reference numeral 32, and this is further processed, as indicated at 34 and 36, to obtain a product electrical-steel sheet or strip, as indicated by reference numeral 38.

Those skilled in the art will appreciate that one test of the cleanliness of the steel is a determination of the oxygen content of the hot-rolled band, determined by taking a sample from each end, the hot-top end and the butt end. For samples made from heats following the invention as explained above, the average oxygen level in the hot-rolled band was 15 parts per million, and 89 percent of the samples had oxygen contents of less than 20 parts per million. In comparison, in samples made from heats in accordance with the prior art practice, using a zoned ladle and no synthetic flux additions, the average oxygen content in the hot-rolled band was 28 parts per million and no sample had oxygen content of less than 20 ppm.

The present invention may make it possible to eliminate a prior art practice of desulfurization which is practiced upon the hot metal before it is added to the BOF. This desulfurization according to the prior art practice is performed by injecting the high-sulphur hot metal with calcium carbide. Desulfurization according to the present invention is achieved during the argon-bubbling step of our process and is sufficiently effective so that satisfactory results are obtained, despite the elimination of prior art practice for desulfurization, unless the hot metal is, for some reason, unusually high in its sulfur content.

To demonstrate the effectiveness of desulfurization of a metal according to the present invention, an 80 ton heat was tapped into the ladle containing a synthetic slag generated by adding 1000-2000 pounds of calcium silicate, 600-1200 pounds of lime, 100-200 pounds of magnesia and 100-200 pounds of spar. The specific gravity of this slag was estimated to be 2.5. It should be noted here that the 600-1200 pounds of lime in the selected mix creates a slag of basicity of 1.2 and leaves behind some additional lime as a separate phase. This feature allows an extremely consistent synthetic slag composition in spite of small amounts of unknown BOF carryover slag. In addition, the separate lime phase gives an added advantage of carrying out desired amount of controlled desulfurization. For instance, with 1200 pounds of lime in the blended mixture, we can desulfurize the BOF steel from 0.055% to 0.015% S. This means that, for nominal sulfur requirements, i.e., sulfur less than 0.03%, we do not need any additional desulfurization on the hot metal side. Argon bubbling stirs the melt beneath the top layer of synthetic slag and beneath the separate lime phase to remove sulfur from the melt. The removal of sulfur in this manner has been found to occur at a substantially constant rate during an initial period of time of about 10 minutes. Test samples show a sulfur removal rate of 0.0011% sulfur per minute. Thereafter, the sulfur removal rate was found to decrease during the later stage of argon bubbling.

Generally the synthetic slag may contain as major components, by weight, 35 to 60 percent CaO, 30 to 50 percent $SiO_2$, and 5 to 15 percent MgO, as well as incidental components. Particularly, the synthetic slag will result in less than 5 percent $Al_2O_3$ and less than 1 percent $TiO_2$. The optimum composition of the synthetic slag in the teem ladle containing silicon steel, at the end of argon bubbling, which was found to give the lowest oxygen residuals and low aluminum, low titanium and low nitrogen contents and thus give the best overall performance was found to be:

| 48% CaO | 40% $SiO_2$ | 10% MgO | less than 0.7% $Al_2O_3$ |
| | less than 0.1% $TiO_2$ | | and 0.2% MnO |

Figure 2:
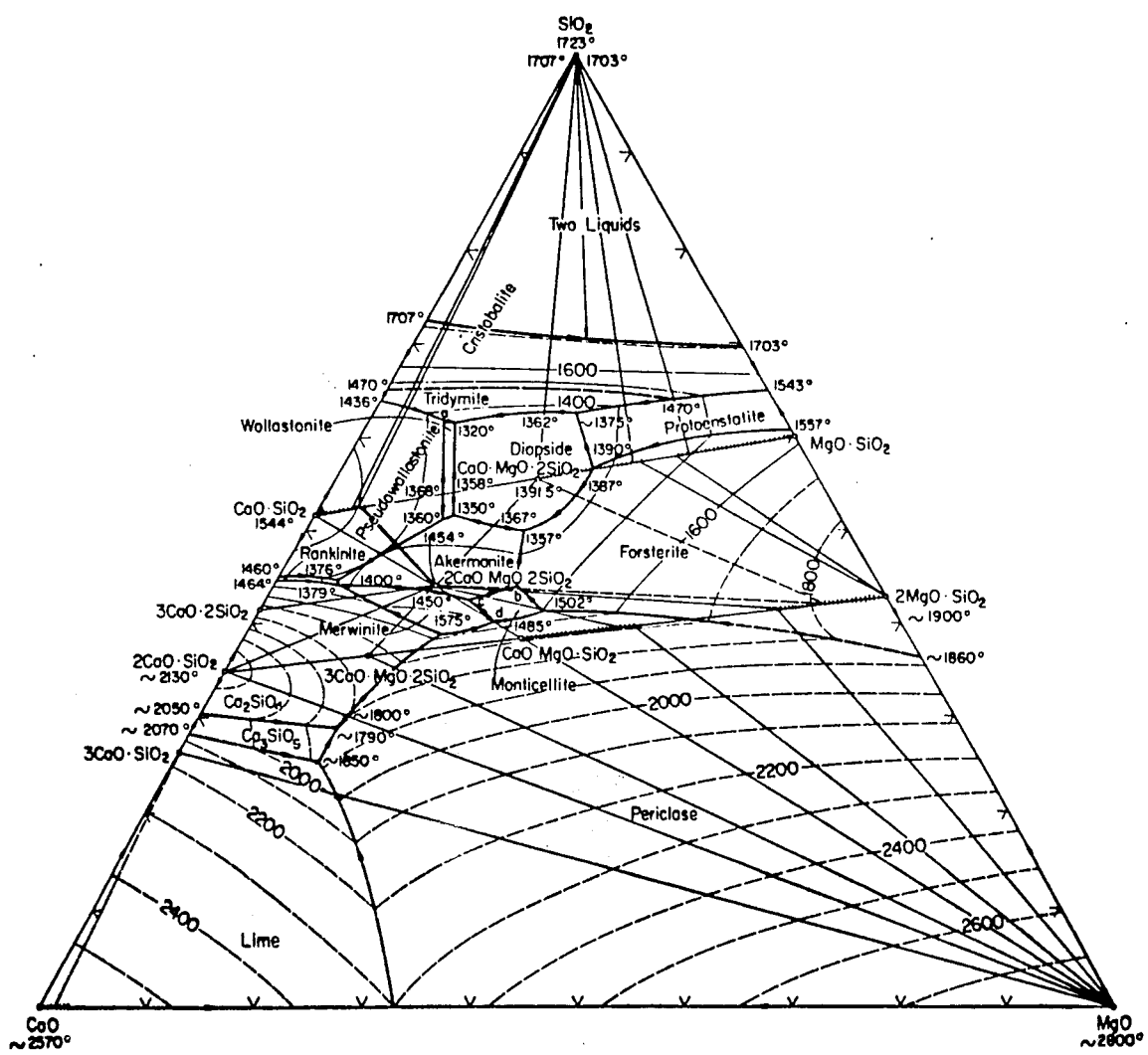
FIG. 2 is a phase diagram of $CaO$-$SiO_2$-$MgO$ system.

The composition of the slag samples taken from teem ladle after argon bubbling indicating that the slag system corresponds to $CaO$-$SiO_2$-$MgO$ system, shown in FIG. 2. In such a ternary system, a fluid, low-melting single phase which is capable of absorbing oxide inclusions was found to have a composition close to the Akermanite phase (Basicity 1.2, MgO-10% and approximate melting point 2550 degrees F.). The fluidity of the single phase can be further enhanced by adding 4 to 5% $CaF_2$ (fluorspar). As explained previously, the volume of the selected single phase should be sufficiently large to absorb most of the oxide inclusions and completely protect the steel surface from air. The resulting slag phase must also be extremely low in alumina ($Al_2O_3$)

and titania ($TiO_2$) contents because of the melt specifications of silicon steel.

EXPERIMENTAL RESULTS

EXAMPLES 1-17

There were made seventeen heats of a low-carbon silicon steel, using a practice in accordance with the present invention.

To be more specific, there was being made a grade of steel which contained the following typical melt composition, in percentages by weight:

| | |
|---|---|
| Carbon | 0.031 |
| Silicon | 3.22 |
| Manganese | 0.071 |
| Copper | 0.22 |
| Sulfur | 0.026 |
| Aluminum | 6.7 ppm |
| Titanium | 12.5 ppm |
| Nitrogen | 49 ppm |

Balance essentially iron.

In making these seventeen heats, there were observed the particular practices which are considered as comprising the present invention. Care was taken to avoid any conveying of slag from the oxygen vessel into the ladle. A ladle lined with dolomite was used. There was provided to the ladle, poured onto the ferrosilicon, a synthetic slag of suitable composition, one based upon the use of a commerically available high-purity calcium silicate plus additions of lime and magnesia and fluorspar (for an 80-ton heat, 1500 pounds of the silicate, 1200 pounds of lime, 200 pounds of magnesia, and 200 pounds of fluorspar). The ladle was provided with a cover, and sufficient argon bubbling was practiced.

From these seventeen heats, there were obtained the following interesting results. The hot-rolled band oxygen contents (based on 64 samples) were, in general, considerably better than the ones obtained with the prior-art practice of using a zoned ladle and no synthetic flux addition. The above mentioned 64 samples yielded oxygen contents ranging from 8 to 37 parts per million, with an average of 15 parts per million and with 89 percent of the samples coming in at under 20 parts per million. This is to be compared with the results for the prior-art practice, where there were taken 62 samples on 14 heats of the same grade of steel, made with a zoned ladle and no synthetic slag addition, and the range was 21 to 46 parts per million of oxygen, with an average of 28 parts per million. The prior-art practice, in other words, never gave a hot-rolled band oxygen content as good as under 20 parts per million.

Figure 3:
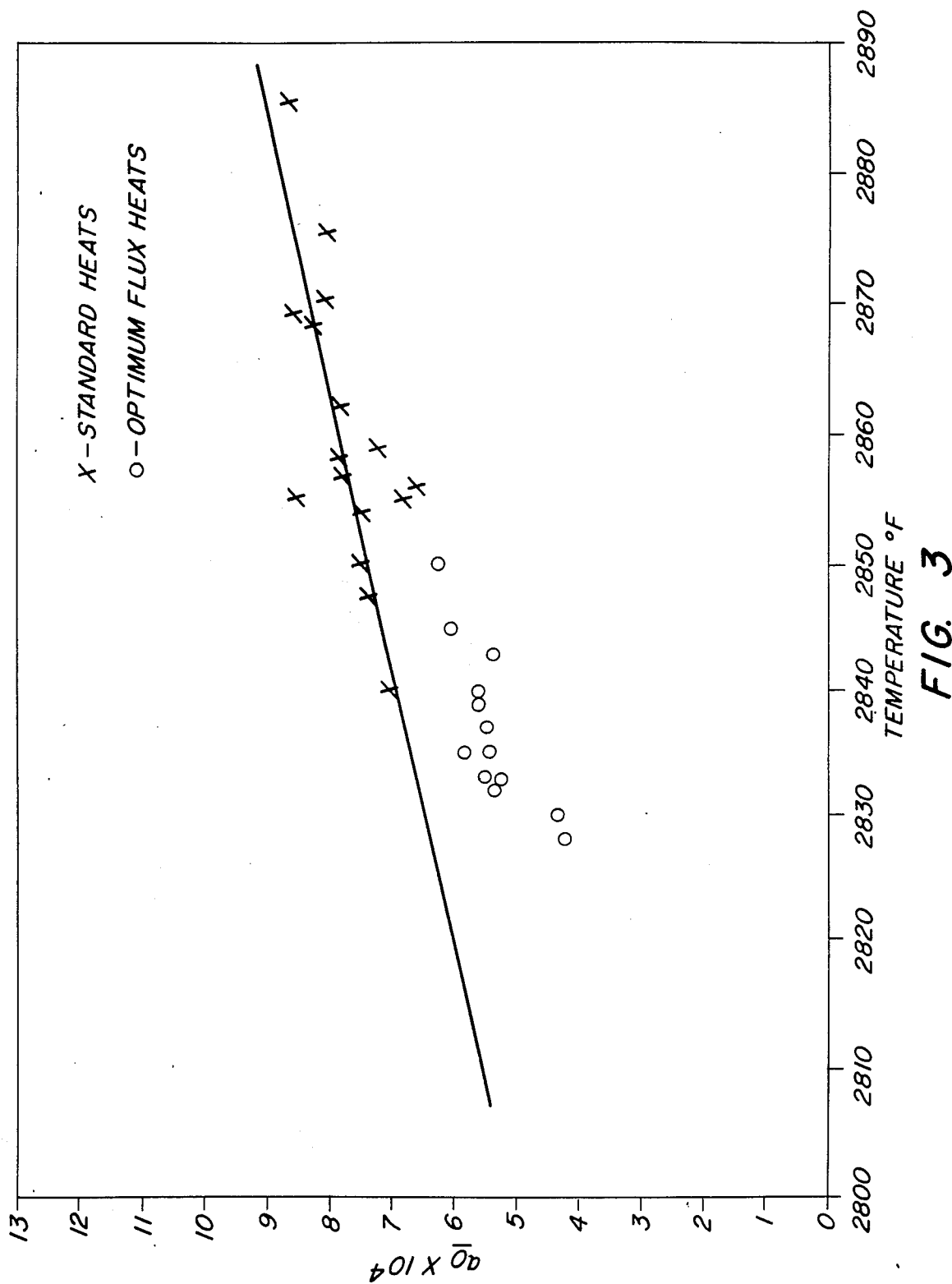
FIG. 3 is a graph of dissolved oxygen values as a function of temperature.

The dissolved oxygen at the end of argon bubbling was measured with an oxygen probe for standard heats as well as for the optimum calcium silicate flux heats. These dissolved oxygen values as a function of temperature are plotted in FIG. 3. Particularly, FIG. 3 is a graph which shows a comparison of dissolved oxygen activities of standard heats with optimum calcium silicate flux heats. By definition, the activity of an element has no units and is the ratio of the vapor pressure of the element in the measured state to the standard state. It can be seen that at any given temperature, at the end of argon bubbling, the dissolved oxygen values measured for the optimum calcium silicate flux heats were about 20-25 percent lower than the standard heats in that temperature range. This is explained by the fact that the calcium silicate flux mixture lowers the activity of silica and therefore for a given silicon content of the melt, the equilibrium dissolved oxygen also gets lowered.

As described herein before, the results with the above-mentioned seventeen heats indicate an improvement with respect to the nitrogen content of the product steel. Pin samples were taken at BOF turndown, after tapping into the ladle, and at the end of the argon bubbling. These had a decrease of about 1 part per million of nitrogen during tapping and a further decrease of about 4 parts per million during the argon bubbling. The pin samples gave the average nitrogen contents at turndown, after tapping, and after argon bubbling as 43, 42, and 38 parts per million, respectively. This is to be compared with an average nitrogen content at turndown of the oxygen vessel of 43 parts per million, and with the prior-art zoned ladle practice, a pickup of nitrogen in the ladle to the level of 49 or 50 parts per million at the end of the argon bubbling.

Moreover, the above-mentioned improvements in the levels of oxygen and nitrogen were obtained without any substantial detriment or penalty in terms of the observed levels of aluminum and titanium in the product steel. In the following Tables I-IV, there are presented the ladle-chemistry results for four groups of heats: Table I presents the above-mentioned seventeen heats numbered 1-17 in accordance with the invention. Table II presents a group of 14 heats, identified as A-N, that represent the prior-art practice with a zoned ladle and no addition of synthetic slag, i.e., prior commercial production practice. Table III presents a group of nine heats, identified as P-X, in an 80% alumina ladle and with an addition of a calcium aluminate synthetic slag. Table IV presents a group of 6 heats, identified as AA--FF, with a dolomite ladle and the addition of a calcium silicate synthetic flux composition made before the optimal composition of the synthetic-slag composition had been determined.

TABLE I

Chemistry Of Product Steel In A Ladle Using A Dolomite Lined Ladle And Synthetic Slag (Contents in Parts Per Million)

| Heats | Oxygen | Aluminum | Titanium | Nitrogen |
|---|---|---|---|---|
| 1 | 32 | 8 | 14 | 36 |
| 2 | 30 | 6 | 11 | 36 |
| 3 | 49 | 3 | 11 | 46 |
| 4 | 34 | 5 | 11 | 46 |
| 5 | 26 | 4 | 10 | 34 |
| 6 | 30 | 5 | 11 | 37 |
| 7 | 28 | 5 | 10 | 26 |
| 8 | 35 | 6 | 11 | 26 |
| 9 | 31 | 4 | 10 | 37 |
| 10 | 34 | 5 | 10 | 53 |
| 11 | 33 | 5 | 10 | 26 |
| 12 | 22 | 8 | 11 | 49 |
| 13 | 28 | 6 | 13 | 49 |
| 14 | 45 | 7 | 13 | 37 |
| 15 | 21 | 9 | 13 | 36 |
| 16 | 34 | 9 | 11 | 35 |
| 17 | 26 | 9 | 12 | 34 |
| 1-17 Avg. | 31.6 | 5.1 | 11.3 | 37.8 |

TABLE II

Chemistry Of Product Steel Using Fireclay Lined Ladle Without Synthetic Flux (Contents in Parts Per Million)

| Heats | Oxygen | Aluminum | Titanium | Nitrogen |
|---|---|---|---|---|
| A | 42 | 7 | 15 | 79 |
| B | 42 | 8 | 13 | 53 |
| C | 40 | 7 | 12 | 46 |
| D | 33 | 7 | 13 | 60 |

TABLE II-continued

Chemistry Of Product Steel Using Fireclay Lined Ladle Without Synthetic Flux
(Contents in Parts Per Million)

| Heats | Oxygen | Aluminum | Titanium | Nitrogen |
|---|---|---|---|---|
| E | 48 | 4 | 10 | 55 |
| F | 43 | 9 | 13 | 61 |
| G | 53 | 12 | 12 | 35 |
| H | 36 | 6 | 12 | 62 |
| I | 35 | 7 | 15 | 57 |
| J | 26 | 7 | 12 | 60 |
| K | 46 | 9 | 14 | 71 |
| L | 36 | 6 | 12 | 51 |
| M | 42 | 7 | 12 | 45 |
| N | 57 | 7 | 11 | 61 |
| A-N Avg. | 41.4 | 7.4 | 12.6 | 56.9 |

TABLE III

Chemistry Of Product Steel Using Alumina Lined Ladles With Calcium Aluminate Synthetic Flux
(Contents in Parts Per Million)

| Heats | Oxygen | Aluminum | Titanium | Nitrogen |
|---|---|---|---|---|
| P | 51 | 7 | 11 | 53 |
| Q | 38 | 15 | 16 | 48 |
| R | 63 | 9 | 13 | 38 |
| S | 61 | 7 | 13 | 48 |
| T | 43 | 9 | 14 | 51 |
| U | 45 | 9 | 13 | 37 |
| V | 41 | 9 | 11 | 41 |
| W | 30 | 12 | 14 | 45 |
| X | 31 | 21 | 14 | 53 |
| Avg. P-X | 44.8 | 10.9 | 13.2 | 46 |

TABLE IV

Chemistry Of Product Steel Using Dolomite Lined Ladles And Nonoptimum Calcium Silicate Synthetic Flux
(Contents in Parts Per Million)

| Heats | Oxygen | Aluminum | Titanium | Nitrogen |
|---|---|---|---|---|
| AA | 54 | 8 | 10 | 46 |
| BB | 41 | 6 | 9 | 53 |
| CC | 37 | 7 | 10 | 38 |
| DD | 30 | 8 | 11 | 34 |
| EE | 27 | 8 | 12 | 34 |
| FF | 32 | 7 | 11 | 34 |
| Avg. AA-FF | 36.8 | 7.3 | 10.5 | 39.8 4 |

MODIFICATIONS AND EQUIVALENTS

Those skilled in the art will appreciate how it is possible, with modification of the chemistry of the synthetic slag to be used, to obtain substantially the same results, but with the use of somewhat different ingredients and/or proportions.

The calcium silicate ($CaO \cdot SiO_2$) does not need to be derived 100% from a commercially available product wherein the lime and silica are already chemically combined; at least some part of it can be replaced with equivalent amounts of lime and silica.

It is known, for example, from U.S. Pat. No. 4,249,906 that when burnt lime is used as flux in a basic oxygen steelmaking process, there is usually available a substantial amount of lime fines which may be recovered and binderlessly briquetted and used as flux material. The briquettes from such a process, whether of pure lime or lime physically admixed with some proportion of silica, afford a conceivable alternative to the use of calcium silicate.

Magnesium and calcium are both alkaline-earth elements. Allowances can be made for the difference in their molecular weight and the differences in properties to be expected from that difference. Thus, equivalent results may be obtained from the use of a pure magnesium silicate material, as a replacement for part or all of the calcium silicate, or from the use of a combination of magnesia and silica.

It is within the scope of the invention to use heated argon or other equivalent inert gas. The idea is to reduce or avoid the heat losses which go with using unheated gases.

While we have shown and described herein certain embodiments of our invention, we intend to cover as well any changes or modifications herein which may be made without departing from its spirit and scope.

We claim as our invention:

1. A composition of matter for use as a synthetic slag, said composition of matter having been made by mixing a commercially pure calcium silicate material with an approximately equal quantity of alkaline-earth flux material selected from the group consisting of lime, magnesia, and mixtures thereof, plus an effective amount of fluidity-promoting additive.

2. A composition of matter as defined in claim 1, wherein said fluidity-promoting additive is fluorspar.

3. A composition of matter for use as a synthetic slag in a process for making low-carbon steel of desirably low dissolved-oxygen content, said composition comprising 35 to 60 weight percent of CaO, 30 to 50 weight percent of $SiO_2$, 5 to 15 weight percent MgO, less than 5% $Al_2O_3$ and less than 1% $TiO_2$.

4. A composition of matter as defined in claim 3, wherein said composition of matter is at an elevated temperature and contains a major portion which is in a liquid state and a minor portion which is in a solid state.

5. The composition of matter as defined in claim 3 wherein said minor portion is substantially comprised of lime.

6. A method for making low-carbon steel containing less than 0.05 percent carbon with a desirably low oxygen content, said steel containing 1.0 to 4.5 weight percent of silicon, said method comprising:
   preparing a low-carbon ferrous melt containing under 0.05 weight percent in an oxygen steelmaking vessel,
   providing a low-alumina, low-titania lined ladle, the ladle lining having less than 5% alumina and less than 2% titania,
   transferring said melt to said ladle,
   adding to said ladle a suitable quantity of ferrosilicon and then adding to said ladle a synthetic-flux composition,
   providing said ladle with a lid,
   bubbling inert gas through the melt in said ladle to produce a product steel, and
   recovering said product steel.

7. A method according to claim 6 wherein the synthetic flux addition produces a lime phase and a synthetic slag phase effective during said step of bubbling an inert gas to desulfurize said melt, to absorb oxide inclusions, to lower dissolved oxygen, to flush out nitrogen and to maintain low residual levels of aluminum and titanium in the product steel.

8. A method according to claim 7 wherein the components of the synthetic slag contain less than 5% alumina and less than 2% titania.

9. A method according to claim 6 wherein adding the synthetic-flux composition is effective to minimize oxide inclusions and decrease dissolved oxygen.

10. A method according to claim 6 wherein said bubbling inert gas through the melt in the ladle is carried out for a sufficient time to desulfurize the melt to less than 0.02% sulfur.

11. A method according to claim 6 wherein said bubbling an inert gas through the melt in the ladle is carried out while the melt is covered with synthetic slag produced by said synthetic flux composition for a sufficient period of time to reduce the nitrogen content of the melt.

12. A method as defined in claim 6, wherein said inert gas is argon.

13. A method as defined in claim 6, characterized by the step of avoiding the transfer of slag in the oxygen vessel into said ladle.

14. A method as defined in claim 6, wherein said product steel contains less than 35 parts per million of oxygen, less than 45 parts per million of nitrogen, less than 10 parts per million of aluminum, and less than 15 parts per million of titanium.

15. A method as defined in claim 6 wherein the average ladle chemistry of said product steel typically contains 30 ppm oxygen, 40 ppm nitrogen, 7 ppm aluminum and 11 ppm titanium.

16. A method as defined in claim 6, wherein said synthetic slag is a slag which consists principally of oxides of metal selected from the group consisting of calcium, magnesium, and silicon, said slag having a slag-basicity ratio ($CaO/SiO_2$) of about 1.1–1.3 and containing an effective amount of a fluidity-promoting agent.

17. A method as defined in claim 6, wherein said synthetic-flux additions consists essentially of about 30 to 80 weight percent of a commercially pure calcium silicate, about 20 to 65 weight percent of oxides selected from the group consisting of calcium oxide and magnesium oxide, and 2 to 15 weight percent of a fluidity-promoting agent.

18. A method as defined in claim 17, wherein said fluidity-promoting agent is fluorspar.

19. A method as defined in claim 17, wherein the synthetic-flux additions are substantially free of alumina and titania.

* * * * *